United States Patent
Jain et al.

(10) Patent No.: US 11,372,529 B1
(45) Date of Patent: Jun. 28, 2022

(54) DIGITAL IMAGE OBJECT ANCHOR POINTS

(71) Applicant: Adobe Inc., San Jose, CA (US)

(72) Inventors: Arushi Jain, Ashok Vihar (IN); Praveen Kumar Dhanuka, Howrah (IN); Varun Sharma, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/392,675

(22) Filed: Aug. 3, 2021

(51) Int. Cl.
*G06F 3/04845* (2022.01)
*G06T 11/60* (2006.01)
*G06F 3/04842* (2022.01)

(52) U.S. Cl.
CPC ...... *G06F 3/04845* (2013.01); *G06F 3/04842* (2013.01); *G06T 11/60* (2013.01)

(58) Field of Classification Search
CPC ... G06F 3/04845; G06F 3/04842; G06T 11/60
See application file for complete search history.

(56) References Cited

U.S. PATENT DOCUMENTS

| 5,500,927 | A | | 3/1996 | Sander-Cederlof et al. | |
|---|---|---|---|---|---|
| 6,065,021 | A | * | 5/2000 | George | G06F 40/103 |
| | | | | | 715/245 |
| 2003/0206169 | A1 | * | 11/2003 | Springer | G06T 11/60 |
| | | | | | 345/442 |
| 2004/0113910 | A1 | | 6/2004 | Tsai et al. | |
| 2007/0296825 | A1 | * | 12/2007 | Ito | G06F 3/011 |
| | | | | | 348/222.1 |
| 2009/0040218 | A1 | | 2/2009 | Museth et al. | |
| 2009/0074302 | A1 | * | 3/2009 | Kishi | G06V 10/46 |
| | | | | | 382/224 |
| 2012/0051655 | A1 | * | 3/2012 | Oto | G06T 9/001 |
| | | | | | 382/199 |
| 2012/0092340 | A1 | * | 4/2012 | Sarnoff | G06T 11/203 |
| | | | | | 345/420 |
| 2019/0287302 | A1 | | 9/2019 | Bhuruth | |
| 2020/0118309 | A1 | * | 4/2020 | Biswas | G06T 11/203 |

OTHER PUBLICATIONS

"Creating Bounding rotated boxes and ellipses for contours", OpenCV, Open Source Computer Vision [online][retrieved Jun. 8, 2021]. Retrieved from the Internet <https://docs.opencv.org/3.4.12/de/d62/tutorial_bounding_rotated_ellipses.html>., Oct. 11, 2020, 2 pages.
"Non-Final Office Action", U.S. Appl. No. 16/805,643, dated Aug. 27, 2021, 23 pages.
"U.S. Application as Filed", U.S. Appl. No. 16/805,643, filed Feb. 28, 2020, 44 pages.

(Continued)

*Primary Examiner* — Shen Shiau
(74) *Attorney, Agent, or Firm* — FIG. 1 Patents (57) ABSTRACT

Digital image object anchor point techniques are described that increase user efficiency in interacting with a user interface to create digital images. This is achieved through use of anchor points by the digital image editing system that are defined with respect to an actual geometry of the object. Further, filtering and prioritization techniques are also leveraged to promote real world utility and efficiency of these techniques as a balance between having too many and two few anchor points.

20 Claims, 8 Drawing Sheets

(56) References Cited

OTHER PUBLICATIONS

McCrae, James et al., "Sketching Piecewise Clothoid Curves", SBM'08: Proceedings of the Fifth Eurographics conference on Sketch-Based Interfaces and Modeling [retrieved Apr. 14, 2021], Retrieved from the Internet <http://diglib.eg.org/bitstream/handle/10.2312/SBM.SBM08.001-008/001-008.pdf?sequence=1&isAllowed=y>., Jun. 2008, 8 pages.

Stanimirović, Predrag S. et al., "Accelerated gradient descent methods with line search", Numerical Algorithms 54 [retrieved Oct. 25, 2021], Retrieved from the Internet <https://doi.org/10.1007/s11075-009-9350-8>., Dec. 10, 2009, 18 pages.

"Final Office Action", U.S. Appl. No. 16/805,643, dated Jan. 18, 2022, 23 pages.

Yang, Junyeong, et al., "Curve Fitting Algorithm Using Iterative Error Minimization for Sketch Beautification", 2008 19th International Conference on Pattern Recognition [retrieved Jan. 12, 2022]. Retrieved from the Internet <https://doi.org/10.1109/ICPR.2008.4761535>., Dec. 2008, 4 pages.

\* cited by examiner

DIGITAL IMAGE OBJECT ANCHOR POINTS

BACKGROUND

Digital image editing systems, as executed by a computing device, support a wide range of functionality to assist in creation and editing of digital images. As part of this, functionality is provided by the digital image editing system to create and position objects within the digital image, e.g., chairs in a beach scene, cars on a racetrack, and so on.

Alignment and spacing of objects are some of the most fundamental principles of visual perception as these convey relationships of the objects to each other. Accordingly, functionality has been developed for implementation by digital image editing systems to assist in alignment and spacing. However, conventional techniques to do so suffer from numerous challenges that limit accuracy and applicability of these conventional techniques.

In a first conventional example, options are made available to reposition objects in relation to each other (e.g., snapping) or output guides, e.g., to indicate spacing between the objects. This is performed based on bounding boxes of the object. The bounding boxes are defined using four lines that enclose the object, e.g., based on extremes of the object in four directions. The bounding boxes are then used as a basis to "snap" the objects in relation to each other, indicate spacing, and so on. However, in some instances an actual geometry of the object is not accurately reflected by the bounding box, e.g., due to limited contact of the object with the bounding box, portions of the object are not visually centered within the bounding box, and so on. As a result, functionality that is defined based on the bounding boxes may fail for its intended purpose, such as to space or reposition objects in a mariner that is visually consistent with the object, itself.

In a second conventional example, a snapping operation used to position an object in relation to another object is defined at a cursor level. When an object is manually dragged within a user interface, for instance, a point at which the object is "grabbed" via the cursor is used as the basis to snap the object to another object. Because of this, accuracy of this technique depends on a user's ability to manually select this point accurately and precisely, the difficulty of which increases as geometric complexity of the object increases. As a result, functionality that is defined at the cursor level often fails for its intended purpose and is prone to error. This causes repeated manual operations as part of a multistep process in order "to get it right" and thus inefficient consumption of computational resources of the digital image editing system to perform these operations.

SUMMARY

Digital image object anchor point techniques are described that overcome the limitations and challenges of conventional techniques to increase user efficiency in interacting with a user interface to create digital images. This is achieved through use of anchor points by the digital image editing system that are defined with respect to an actual geometry of the object. Further, filtering and prioritization techniques are also leveraged to promote real world utility and efficiency of these techniques as a balance between having too many and two few anchor points.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Conventional techniques used to aid in positioning of objects as part of creating and editing a digital image often fail for their intended purpose. This is often the case because conventional techniques are not based directly on the object, itself, but rather indirectly on entities derived from the object (e.g., a bounding box), a point-of-contact with the object, and so forth. As such, conventional techniques often involve repeated user interaction and inefficient consumption of computational resources by digital image editing systems that make these conventional techniques available.

Accordingly, digital image object anchor point techniques are described that overcome the limitations and challenges of conventional techniques to increase user efficiency in interacting with a user interface to create digital images. This is achieved through use of anchor points by the digital image editing system that are defined with respect to an actual geometry of the object. Further, filtering and prioritization techniques are also leveraged to promote real world utility and efficiency of these techniques as a balance between having too many and two few anchor points.

In an example, the digital image editing system detects selection of an object, e.g., through use of a cursor control device, gesture, and so forth. In response, the digital image editing system generates anchor points based on the underlying geometry of the object as a basis to control location operations, e.g., snapping, spacing, alignment, output of visual guides, and so forth.

To do so, the digital image editing system generates candidate anchor points. In an instance in which the object is a vector object, the digital image editing system includes anchor points that are used to define the vector object for rendering, e.g., from Bezier curves the form the object. Thus, these anchor points are "explicit" through explicit definition as part of the geometry of the object. The digital image editing system is also configured to add "implicit" anchor points that are exhibited by geometric features of the object. Examples of geometric features that are usable to derive implicit anchor points include geometric extremes, curvature, and so on that are exhibited in localized portions of the object. Other examples are also contemplated, including candidate anchor points defined by points of the object that intersect a bounding box of the object.

The candidate anchor points are then filtered by the digital image editing system to form a filtered set of anchor points. This is used to arrive at a set that is visually applicable to location operations of the system as applied to the object and also increase efficiency in computational resource consumption. A variety of techniques are usable by the digital image editing system to filter the candidate anchor points, such as to keep corner points, explicit points, points associated with maximum and minimum local curvatures, local geometric extremes, based on visual importance, and so on. As part of this, weights are assigned to respective points based on the corresponding characteristics used to arrive at the filtered set of anchor points.

For any location operation, a variety of anchor points may satisfy constraints of the operation. Accordingly, the digital image editing system employs prioritization techniques to determine which of the anchor points from the filtered set of anchor points is to be used as part of the operation. To do so, the digital image editing system accounts for a distance between the anchor points and a point, at which, the object is selected, i.e., "grabbed," as weights assigned to the anchor points A direction of movement of the object is also considered as part of assigning weights to the anchor points along with the weights assigned to the anchor points as part of filtering above. The priority is then based on a decreasing order of the weights and used as part of the location operation, e.g., for snapping, alignment, spacing, and so forth. In this way, the techniques described herein increase user efficiency and accuracy when interacting with the digital image editing system by reducing a number of operations as well as increase computations resource efficiency resulting from this reduction. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Medium Environment

Figure 1:
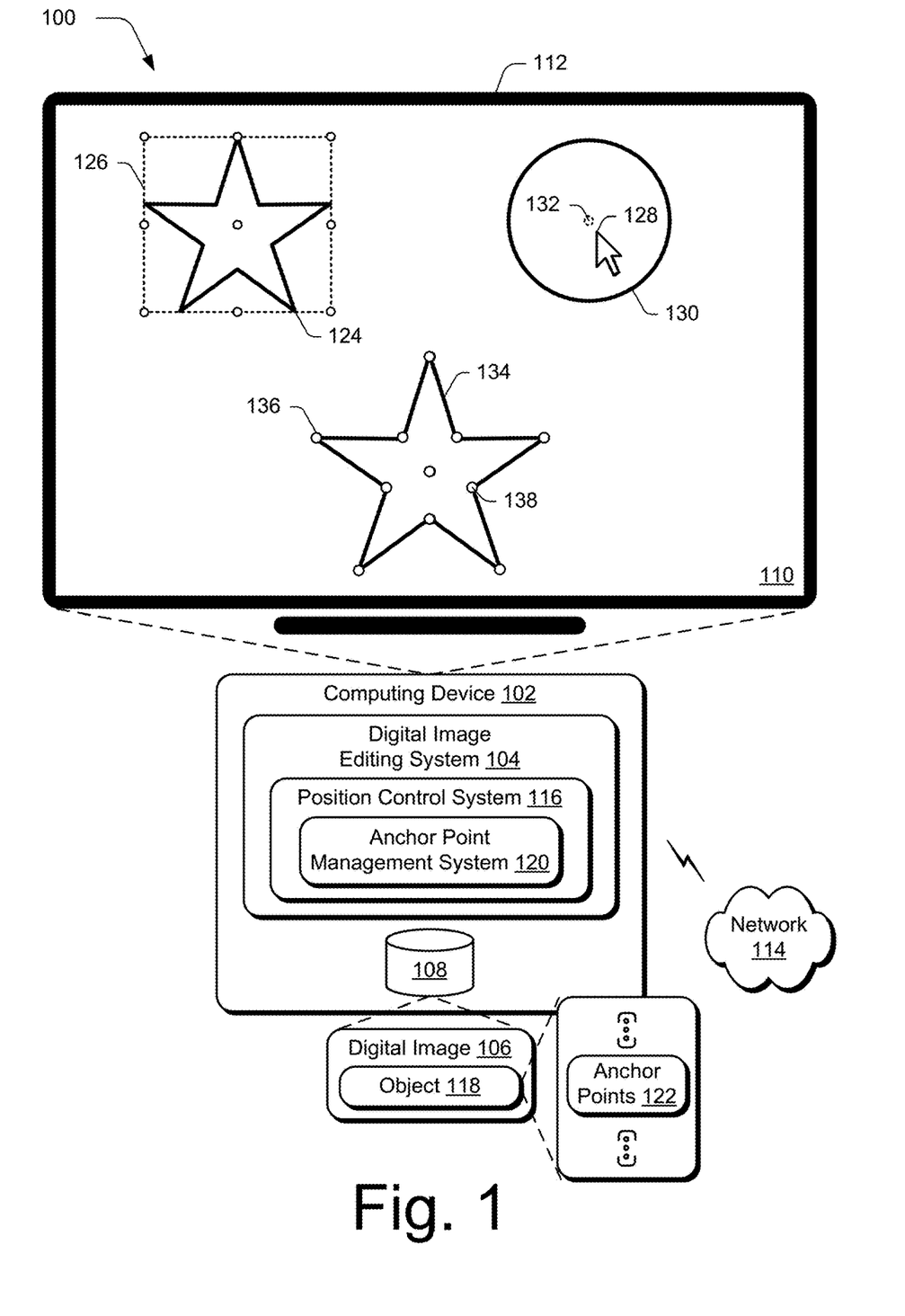
FIG. 1 is an illustration of an environment in an example implementation that is operable to employ digital image object anchor point techniques described herein.

FIG. 1 is an illustration of a digital medium environment 100 in an example implementation that is operable to employ anchor point and location operation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a digital image editing system 104. The digital image editing system 104 is implemented at least partially in hardware of the computing device 102 to process and transform a digital image 106, which is illustrated as maintained in storage 108 (e.g., a computer-readable storage medium) of the computing device 102. Such processing includes creation of the digital image 106, modification of the digital image 106, and rendering of the digital image 106 in a user interface 110 for output, e.g., by a display device 112. Digital images 106 including any form of visual presentation that is capable of being rendered for display in the user interface 110. Although illustrated as implemented locally at the computing device 102, functionality of the digital image editing system 104 is also configurable as whole or part via functionality available via the network 114, such as part of a web service or "in the cloud."

An example of functionality incorporated by the digital image editing system 104 to process the image 106 is illustrated as a position control system 116. The position control system 116 is configured to control operations involving location of objects 118 (i.e., location operations) within the digital image 106. Objects 118 are configurable in a variety of ways, examples of which include vector objects, raster objects, or any other object that is capable of being as part of the digital image 106 in the user interface 110 by the display device 112. The position control system 116 includes an anchor point management system 120 that is configured to generate anchor points 122, based on an actual geometry of the object 118, that are used to define implementation of the location operation. In this way, the location operation has increased accuracy and follows a user's visual expectations in executing these operations.

In the illustrated user interface 110, an example of an object 118 is depicted as a star 124. A bounding box 126 is generated based on maximums of the star 124 along four perpendicular directions, e.g., up, down, left, and right. Conventional techniques used for location operations are then based on the bounding box, illustrated examples of which include corners and midpoints along each line that forms a side of the bounding box as well as for a center of the bounding box. As is readily apparent, however, these points do not correspond with an actual geometry of the star 124, e.g., none of the points fall on the star and even the center point of the bounding box if offset from an actual center of the star 124.

In another example, the location operation is defined at a cursor level such that a point 128 at which an object that is selected is used as a basis to perform the operation. Thus, this relies on a user's ability to accurately determine a characteristic of the object that is to be selected and then also manually make an accurate selection based on that determination. In the illustrated example in which the object is a circle 130, a user input is received that selects a point 128 that is estimated by the user as a center of the circle 130. However, in actuality this point 128 is offset from an actual center 132 of the circle. Thus, in this example the user is tasked with making a "best guess" often involving repeated operations until the result appears visually correct, which results in user frustration and inefficient use of computational resources.

Accordingly, techniques are described in which the anchor point management system generates anchor points 122 that are directly based on an underlying geometry of the object 118. In another example of an object 118 illustrated as a star 134, anchor points 122 are defined by the anchor point management system 120 at the tips 136 and bases 138 of points of the star 134. This is performed by taking into account a geometry of the object 118, directly. As a result, location operations that depend on the anchor points 122 have increased accuracy and follow visual expectations, further discussion of which is described in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Anchor Point Generation and Use

Figure 2:
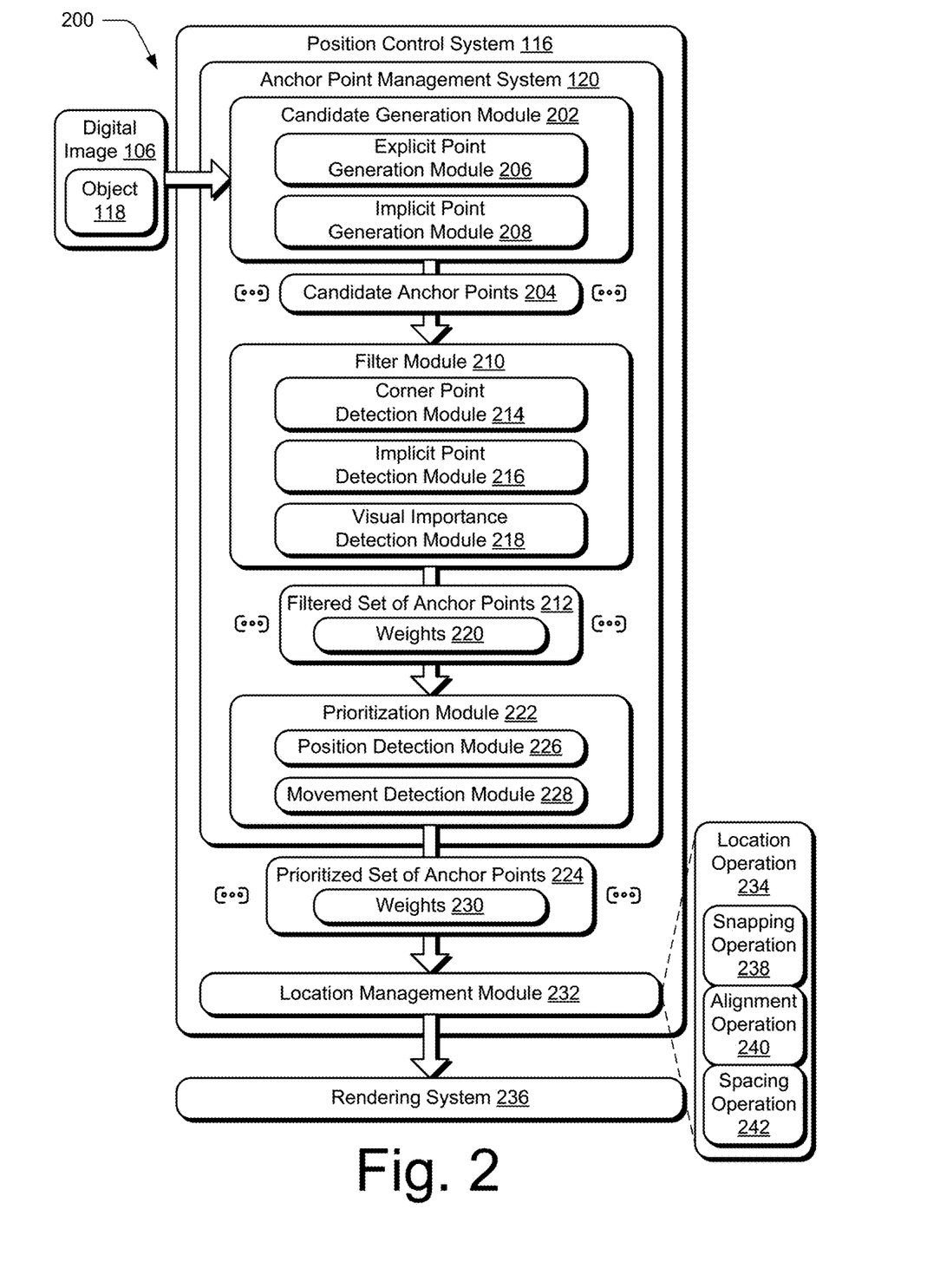
FIG. 2 depicts a system showing operation of an anchor point management system of FIG. 1 in greater detail.
Figure 3:
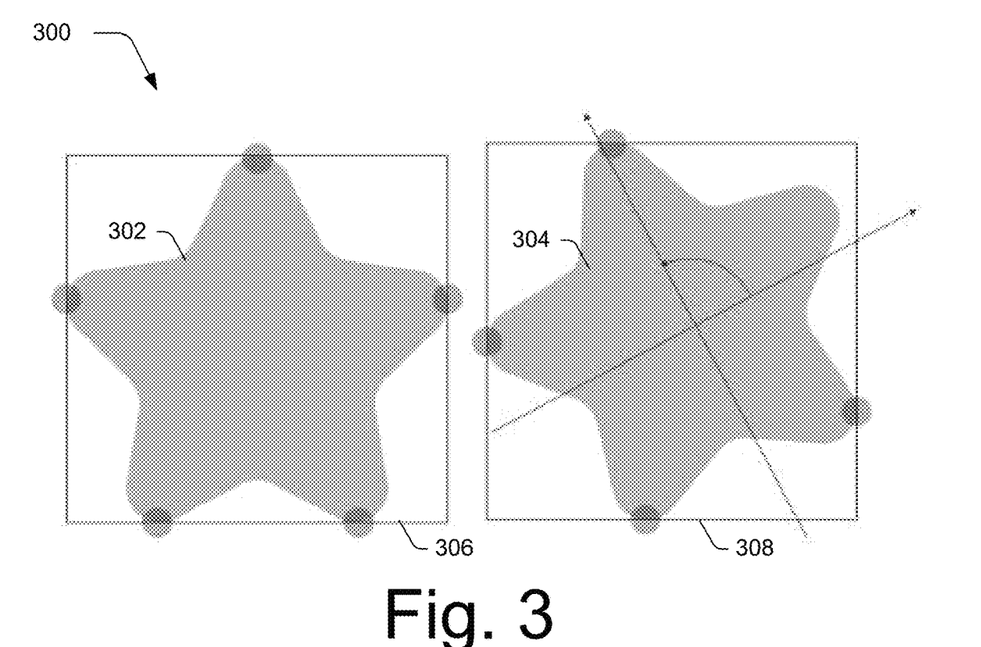
FIG. 3 depicts an example implementation of detecting geometric extremes of an object as part of generating candidate anchor points.
Figure 4:
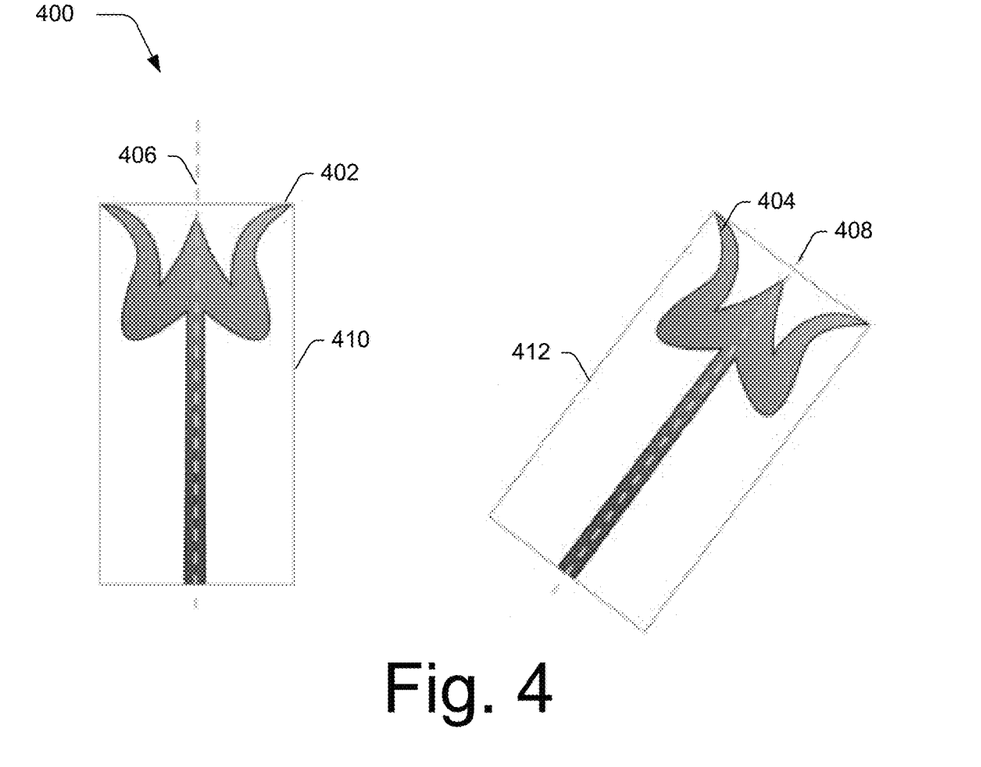
FIG. 4 depicts an example implementation of directional flow analysis as part of generating candidate anchor points.

FIG. 2 depicts a system 200 showing operation of the anchor point management system 120 of FIG. 1 in greater detail. FIG. 3 depicts an example implementation 300 of detecting geometric extremes of an object as part of generating candidate anchor points. FIG. 4 depicts an example implementation 400 of directional flow analysis as part of generating candidate anchor points.

Figure 5:
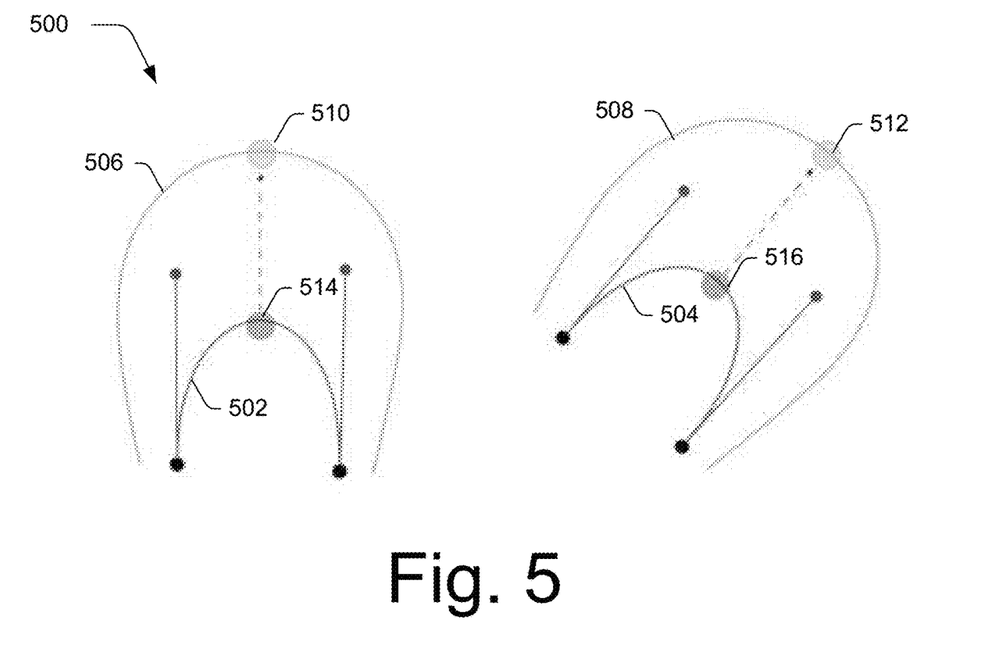
FIG. 5 depicts an example implementation of detecting extremes in a curvature domain as part of generating candidate anchor points.
Figure 6:
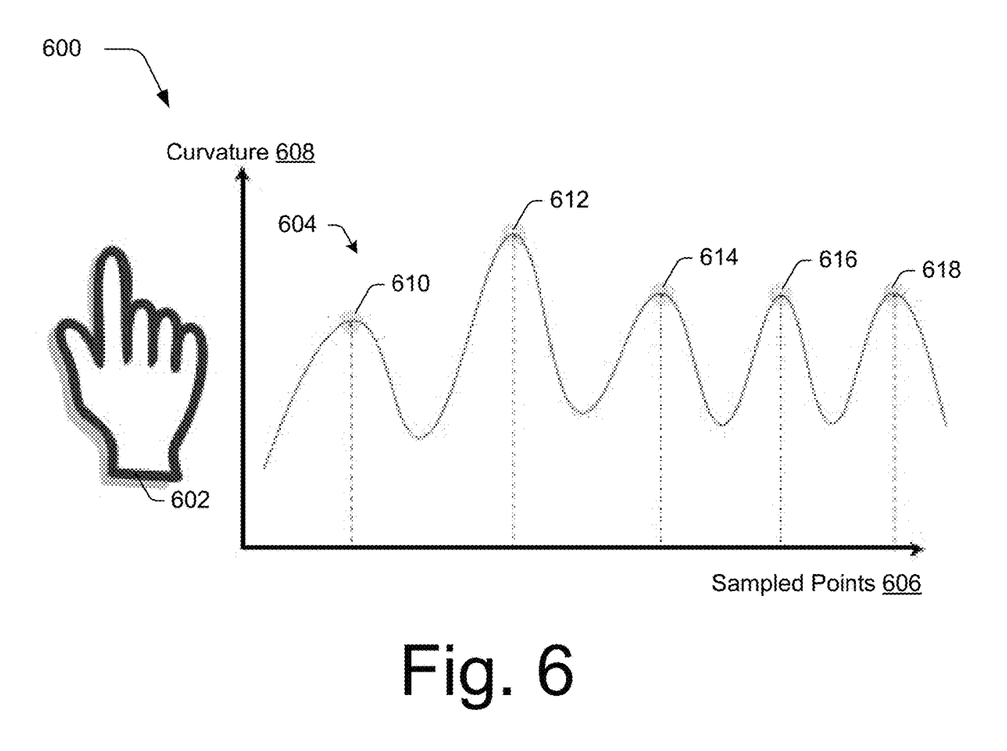
FIG. 6 depicts an example implementation of curvature analysis and local extremes as part of generating candidate anchor points.
Figure 7:
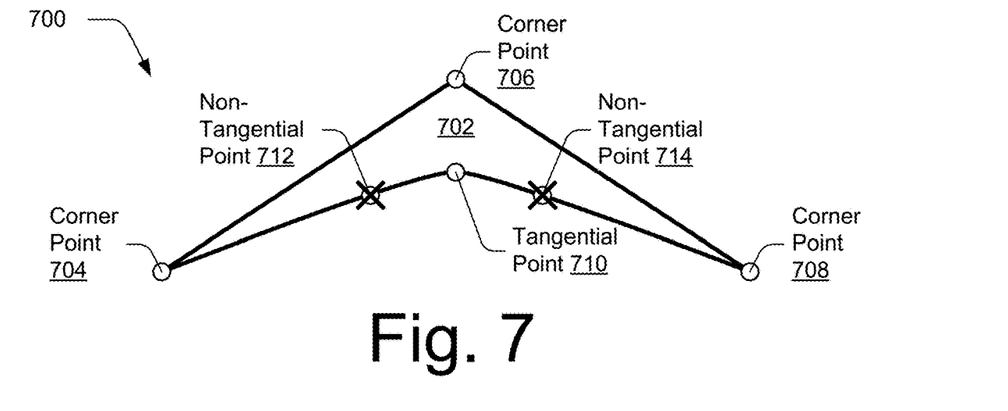
FIG. 7 depicts an example implementation of filtering of the candidate anchor points.
Figure 8:
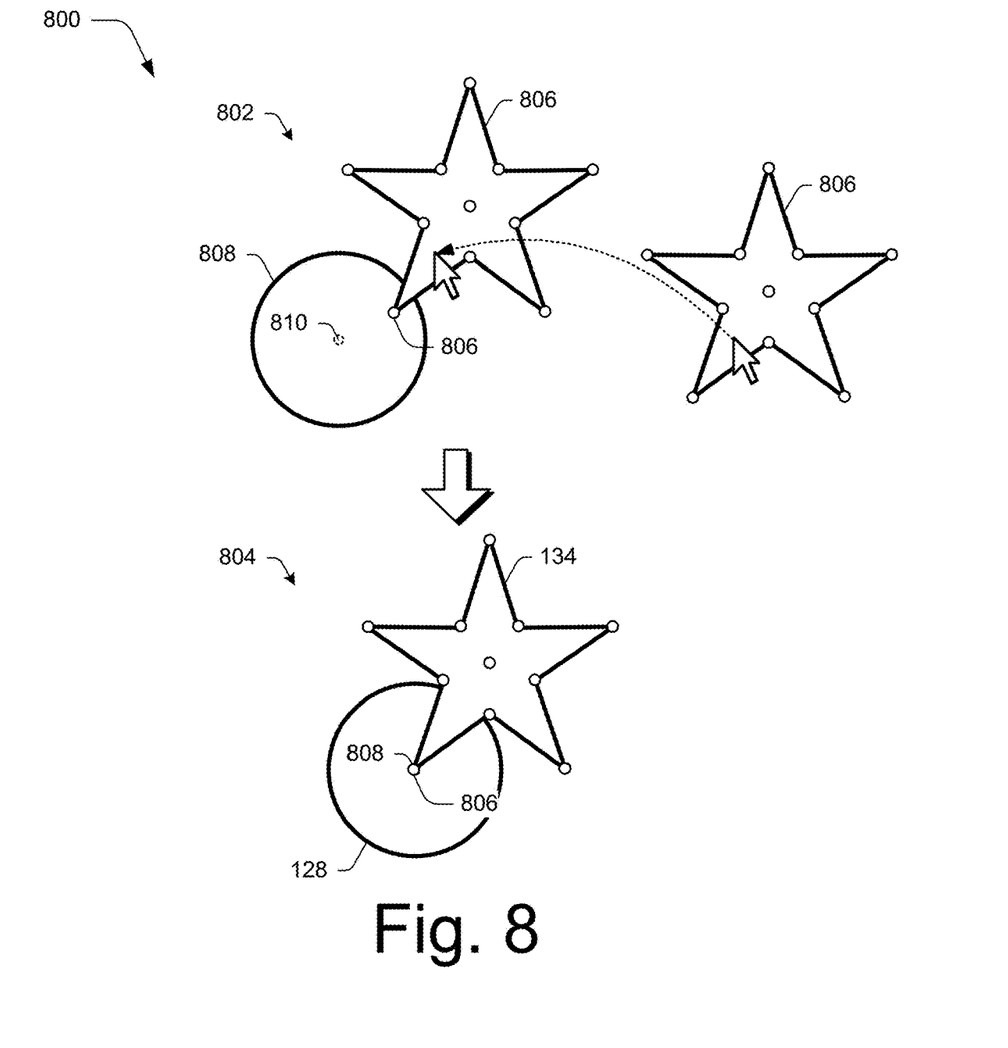
FIG. 8 depicts an example implementation of a location operation involving snapping.
Figure 9:
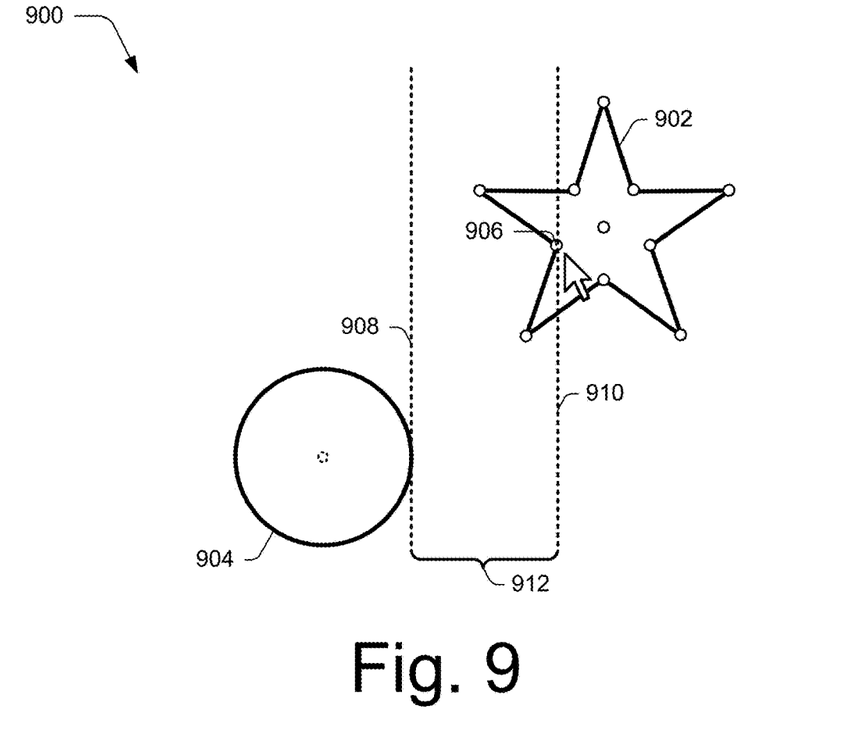
FIG. 9 depicts an example implementation of a location operation involving spacing.
Figure 10:
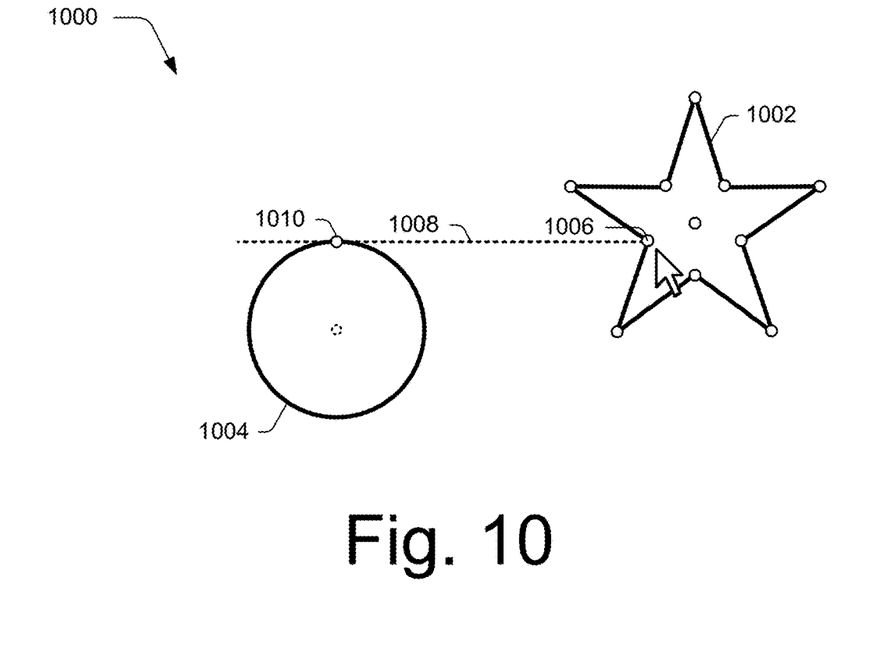
FIG. 10 depicts an example implementation of a location operation involving alignment.
Figure 11:
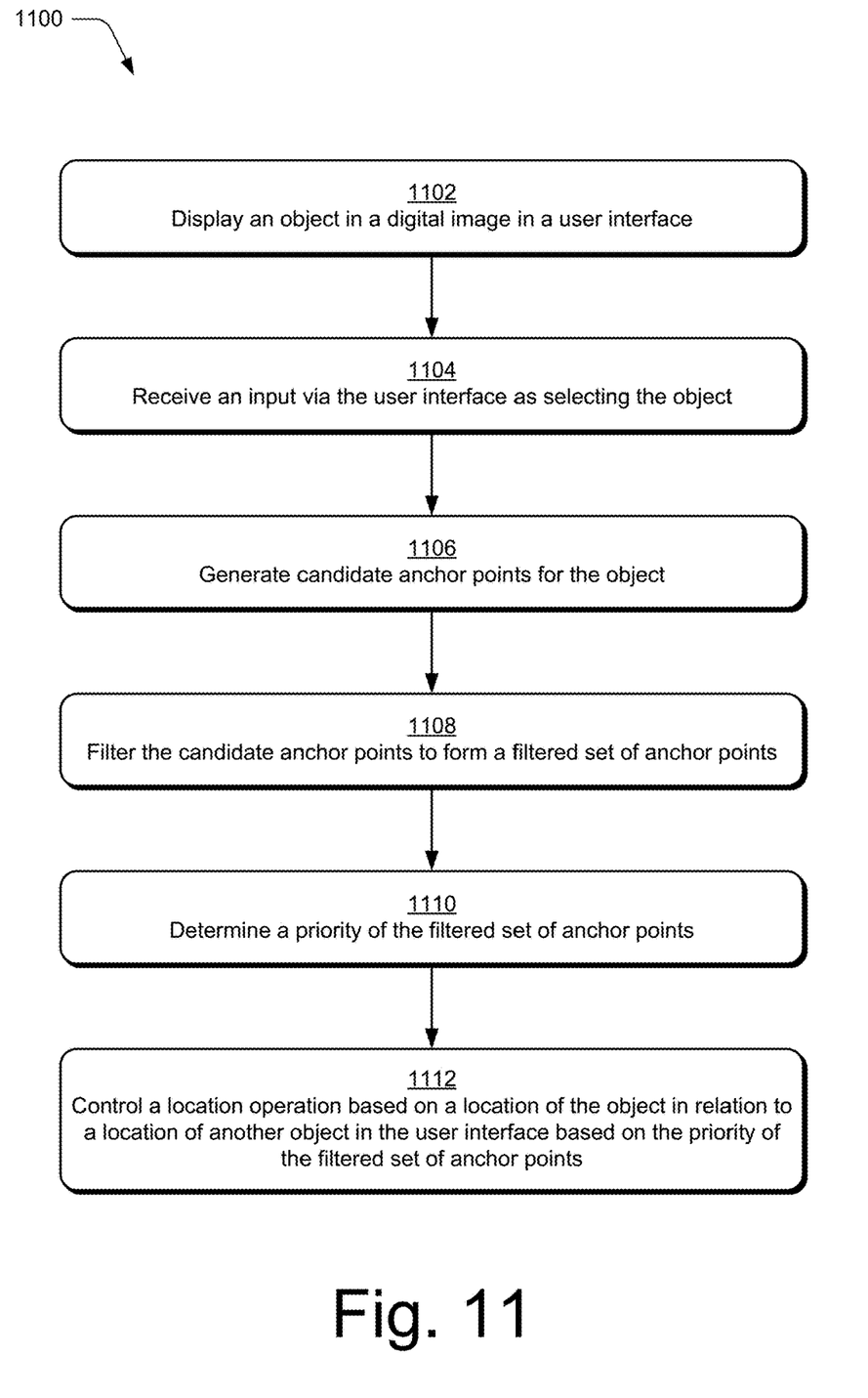
FIG. 11 is a flow diagram depicting a procedure in an example implementation that includes generating candidate anchor points, filtering the candidate anchor points, and prioritizing the filtered anchor points for implementation of a location operation.

FIG. 5 depicts an example implementation 500 of detecting extremes in a curvature domain as part of generating candidate anchor points. FIG. 6 depicts an example implementation 600 of curvature analysis and local extremes as part of generating candidate anchor points. FIG. 7 depicts an example implementation 700 of filtering the candidate anchor points. FIG. 8 depicts an example implementation 800 of a location operation involving snapping. FIG. 9 depicts an example implementation 800 of a location operation involving spacing. FIG. 10 depicts an example implementation 1000 of a location operation involving alignment. FIG. 11 depicts an example procedure 1100 that includes generating candidate anchor points, filtering the candidate anchor points, and prioritizing the filtered anchor points for implementation of a location operation.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin in this example, an object in a digital image is displayed in a user interface (block 1102). An example of an object 118 displayed in a user interface 110 is illustrated in FIG. 1 as a star 134. An input is then received via the user interface 110 as selecting the object (block 1104). A variety of different user inputs are usable to select the object, e.g., as a single "click" of a mouse or gesture, a series of selections (e.g., for a location operation involving alignment or spacing of multiple objects), a "click-and-drag" operation, and so forth.

In response to the user input (which may also identify a corresponding location operation), a candidate generation module 202 of the anchor point management system 120 is utilized to generate candidate anchor points 204 for the object 118 (block 1106). The candidate anchor points 204 are generated based on a variety of characteristics of an underlying geometry of the object 118.

In one example, an explicit point generation module 206 is configured to generate explicit anchor points. These anchor points are "explicit" through inclusion as part of a definition used to render the object 118. For example, the explicit point generation module 206 first detects that the object 118 is a vector object. In response, the explicit point generation module 206 takes anchor points from the vector geometry for inclusion as part of the candidate anchor points 204. In some instances, a number of candidate anchor points defined in the vector geometry exceeds a threshold number, e.g., based on overall number, density such as a number of anchor points in a defined area, etc. In response, the explicit point generation module 206 first simplifies the vector geometry and includes anchor points from the simplified geometry as part of the candidate anchor points 204. An example of simplifying a vector geometry is described by U.S. patent application Ser. No. 16/805,643, filed Feb. 28, 2020 to A. Phogat et al and titled, "Path Simplification for Computer Graphics Applications" which is hereby incorporated by reference in its entirety.

In another example, an implicit point generation module 208 is utilized to generate candidate anchor points 204 that are not explicitly defined as part of the object definition used to render the object, but are still good candidates. A variety of characteristics of the object 118 are identifiable by the implicit point generation module 208 to generate these candidate anchor points 204.

As shown in the example implementation 300 of FIG. 3, geometric extremes are used by the implicit point generation module 208 to calculate candidate anchor points 204. To do so, the implicit point generation module 208 determines which points of first and second shapes 302, 304 intersect respective first and second bounding boxes 306, 308. The bounding boxes may be created in a variety of ways. In the example of FIG. 3, the first and second bounding boxes 306, 308 are axis aligned. However, this may not represent a "true" visual bounding box as this is not rotation invariant. For example, even though the first and second shapes 302, 304 match, the portions of the first and second shapes 302, 304 that intersect respective first and second bounding boxes 306, 308 changes as rotation of the first and second shapes 302, 304 changes.

Accordingly, as shown in an example implementation 400 of FIG. 4, the implicit point generation module 208 utilizes directional flow analysis. In this example, first and second shapes 402, 404 are also illustrated that match. The implicit point generation module 208 is used to determine a first and second directional flow 406, 408 that corresponds to the respective first and second shapes 402, 404 as displayed in a user interface. This is performable in a variety of ways, such as by determining which axis of the first and second shapes 402, 404 is the longest, which is then set as the first and second directional flows 406, 408. Minimum area rotated rectangles are then generated as the first and second bounding boxes 410, 412 based on the respective first and second directional flows 406, 408. Intersection with theses bounding boxes therefore also defines geometric extremes which are rotation invariant and are included as candidate anchor points 204.

FIG. 5 depicts another example implementation 500 in which the implicit point generation module 208 generates candidate anchor points 204 that are rotation invariant. In this example, curvature is utilized to add candidate anchor points at extremes in a curvature domain. First and second input geometries 502, 504 are illustrated having respective first and second curvatures 506, 508. First and second points of maximum curvature 510, 512 for the respective first and second curvatures 506, 508 define respective first and second candidate anchor points 514, 516 for the respective first and second input geometries 502, 504. As a result, these candidate anchor points are also rotation invariant as based on extremes in curvature exhibited by the underlying geometries.

FIG. 6 depicts another example implementation 600 in which the implicit point generation module 208 generates candidate anchor points 204 that are rotation invariant based on curvature. An object shaped as a hand 602 is illustrated. A curvature plot 604 is then formed by the implicit point generation module 208 as sampled points 606 from the hand 602 and respective curvatures 608 at those points, i.e., a function of curvature values defined at each of the sampled points. In the illustrated example, local maximum values 610, 612, 614, 616, 618 of curvature are used to define candidate anchor points 204, e.g., through use of defined intervals, sliding windows, and so forth. As a result, the candidate anchor points 204 track the tips of the fingers of the hand 602 in the illustrated example. Local minimum values may also be used to generate candidate anchor points 204, e.g., to include bases of the fingers of the hand 602. As a result, this technique is also rotation invariant.

Hybrid approaches are also usable by the implicit point generation module 208. In some situations, a curvature plot may include plateaus that correspond to an arc-shaped region. In this situation, an extreme is found by the implicit point generation module 208 using sample points between start and end points of the plateau. Therefore, instead of using an entirety of the input geometry in this example, samples points corresponding to the plateau region are used to find candidate anchor points based on curvature in this arc-shaped region of the curvature plot.

The candidate anchor points 204 are then passed from the candidate generation module 202 as an input to a filter module 210. The filter module 210 is configured to filter the candidate anchor points 204 to form a filtered set of anchor points 212 (block 1108). A variety of techniques are usable by the filter module 210 to perform the filtering, functionality of which is represented by a corner point detection module 214, an implicit point detection module 216, and a visual importance detection module 218.

As shown in the example implementation 700 of FIG. 7, an object is displayed having candidate anchor points. The corner point detection module 214 is configured to add candidate anchor points 204 to the filtered set of anchor points 212 as corner points 704, 706, 708 that correspond to corners of the object 702. Weights 220 associated with these corner anchor points is set as "$w_{co}$."

Anchor points are also added to the filtered set of anchor points 212 by an implicit point detection module 216, e.g., for a tangential point 710 based on respective curvatures. The anchor points associated with a maximum/minimum local curvature have weights of "$w_{eu}$," those corresponding to local geometric extremes have weights of "$w_{ge}$," hybrid anchor points have weights of "$w_{hy}$," and weights for points which intersect a bounding box have weights of "$w_{bb}$."

Remaining candidate anchor points 204 are then tested by the visual importance detection module 218 for an amount of visual importance respective ones of the candidate anchor points 204 have on an appearance of the object 118. In an instance in which the object 118 is a vector object, for instance, respective candidate anchor points 204 are removed from the object 118. The visual importance detection module 218 ascertains whether a visual change is exhibited by the object 118, e.g., by an input Bezier geometry. In a visual change is not exhibited, the respective candidate anchor point is discarded, i.e., "filtered out." For example, the non-tangential points 712, 714 are removed because removal of these points does not visually affect the object 702. If a visual change is exhibited, the respective candidate anchor point is added to the filtered set of anchor points 212 and given a weight of "$w_{lo}$."

The filtered set of anchor points 212 and associated weights are then passed as an input to a prioritization module 222. The prioritization module 222 is configured to generate a prioritized set of anchor points 224 to set a priority for which point is determined (block 1110) for use by a location operation. For a location operation, the filtered set of anchor points 212 may include multiple points that satisfy constraints of the operation, i.e., are eligible for use as part of the operation. Accordingly, the prioritization module 222 is configured to determine a priority for the filtered set of anchor points 212 in order to generate a prioritized set of anchor points 224 that is used to control which of these points are used for the location operation.

The prioritization module 222, in a first instance, leverages weights assigned to respective anchor points of the filtered set of anchor points 212. The respective anchor points, for instance, may be assigned one or more weights based on characteristics of the anchor points in relation to a geometry of the object 118. Further, amounts assigned to these characteristics is variable, e.g., to give a greater weight to corner points over tangential points, points that intersect the bounding box (e.g., "$w_{bb}$") than internal points, and so forth.

A position detection module 226 is also employed to take into account a relative distance of the filtered set of anchor points 212 from a selection point used to select the object 118. In an implementation, the distance from each of the filtered set of anchor points 212 to the selection point (e.g., cursor selection point or gesture touch point) is determined and then normalized (e.g., between (0,1)) as an additional weight "$w_{eu}$" used to determine the priority.

Movement of the object 118 is also detected by the movement detection module 228 and usable to set weights based on a direction of movement, proximity to another object that is also to be used as part of the location operation, and so on. The location operation, for, instance, is definable to base a respective operation on location of the anchor point on the object 118 with respect to a location of an anchor point on another object. Accordingly, distances between the anchor point on the other object and the filtered set of anchor points 212 is also usable to assign weights, e.g., following normalization techniques as described above.

In another example, the movement of the object 118 includes a corresponding direction in the user interface that is usable to assign weights, e.g., to anchor points as following a vector of movement of the object in the user interface. The movement detection module 228, for instance, assigns greater amounts of weight to anchor points at a leading edge of movement of the object to a trailing edge of the object based on a vector describing the object's movement.

The weights 230 (and respective amounts) assigned to the filtered set of anchor points 212 are then passed as a prioritized set of anchor points 224 to a location management module 232 to execute a location operation 234 for rendering in a user interface by a rendering system 236. A variety of examples of location operations 234 are contemplated, examples of which include a snapping operation 238, alignment operation 240, and spacing operation 242.

FIG. 8 depicts an example implementation 800 of a location operation 234 as a snapping operation 238. This example is illustrated using first and second stages 802, 804. At the first stage 802, a first object 806 is selected at a first location and moved to a second location in a user interface toward a second object 808, the movement of which is illustrated using a dashed arc. The location management module 232 determines, automatically and without further user intervention, that constraints of a snapping operation 238 are met. The constraints indicate that a first anchor point 806 (based on a priority) of the first object 806 is to be "snapped" to a second anchor point 810 of the second object 808. In response, the first object 806 selected via a user input is repositioned by the module such that the first anchor point 806 is positioned at a location of the second anchor point 810 in the user interface.

FIG. 9 depicts an example implementation 800 of a location operation 234 that is a spacing operation 242. In the previous example, the location operation 234 involves repositioning of objects within the user interface 110. Examples are also contemplated in which the location operation 234 involves output of visual guides in the user interface 110. As shown in the example spacing operation 242, first and second objects 902, 904 are displayed in a user interface 110. The first object 902 is selected (e.g., using a cursor) and moved in relation to the second object 904. An anchor point 906 that is prioritized based on location near the selection point and other techniques described above is used as a basis to output first and second guides 908, 910 indicating a spacing interval 912.

Figure 12:
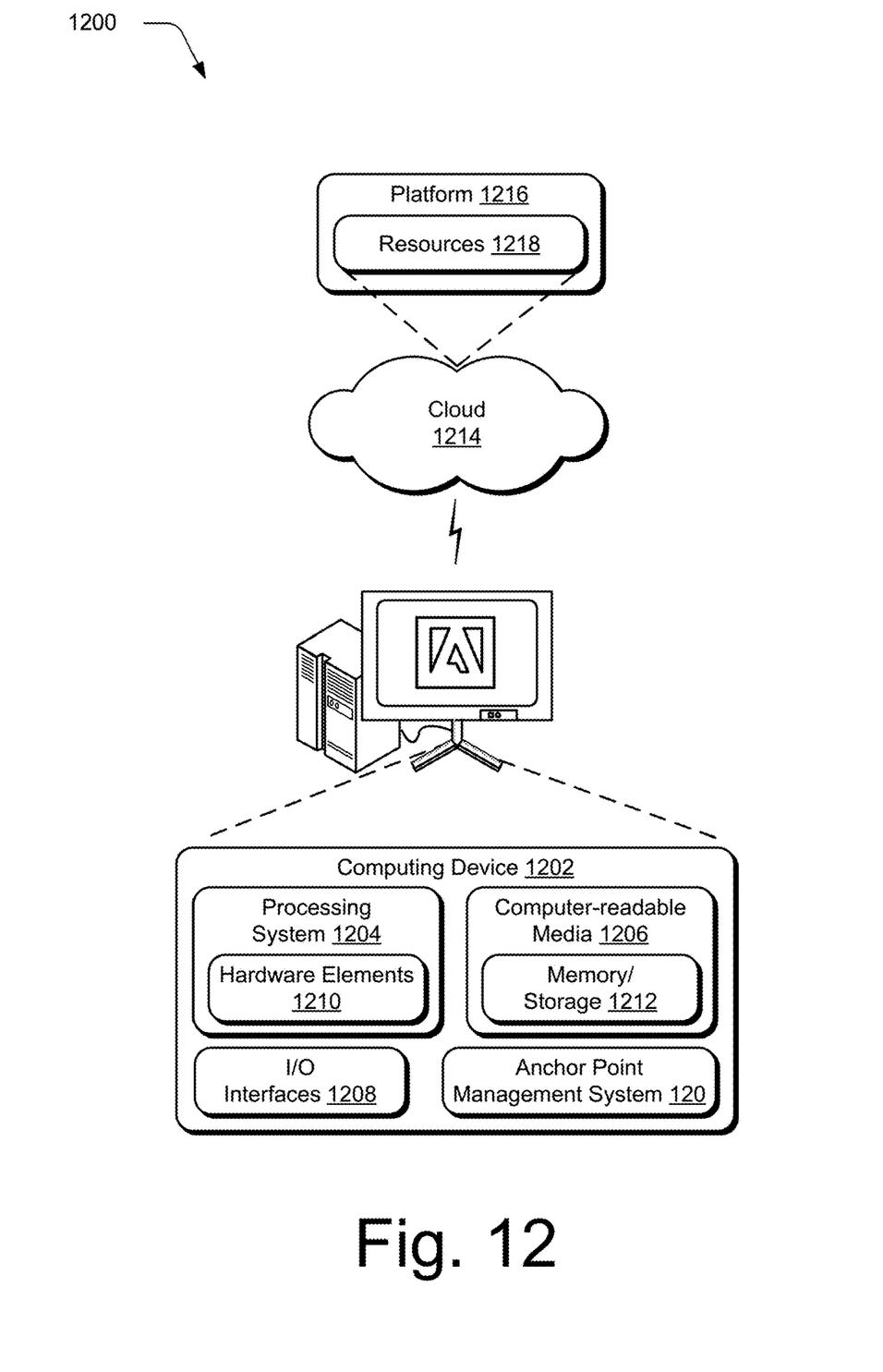
FIG. 12 illustrates an example system including various components of an example device that can be implemented as any type of computing device as described and/or utilize with reference to FIGS. 1-11 to implement embodiments of the techniques described herein.

FIG. 10 depicts an example implementation 1000 of a location operation 234 as an alignment operation 240 that also employs visual guides. In the example alignment operation 240, first and second objects 1002, 1004 are also displayed in a user interface 110. The first object 1002 is again selected (e.g., using a cursor) and moved in relation to the second object 1004. An anchor point 1006 that is prioritized based on location near the selection point and other techniques described above is used as a basis to output a visual guide 1008 indicating alignment in relation to a second anchor point 1010 of the second object 1004. A variety of other examples of location operations involving output of visual guides and/or repositioning of visual objects are also contemplated without departing from the spirit and scope thereof Example System and Device FIG. 12 illustrates an example system generally at 1200 that includes an example computing device 1202 that is representative of one or more computing systems and/or devices that implement the various techniques described herein. This is illustrated through inclusion of the anchor point management system 120. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium object location environment, a method implemented by a computing device, the method comprising:

generating, by the computing device, candidate anchor points for an object included in a digital image displayed in a user interface;

filtering, by the computing device, the candidate anchor points, to generate a filtered set of anchor points;
determining, by the computing device, priority of the filtered set of anchor points, one to another; and
controlling, by the computing device, a location operation based on a location of the object in relation to a location of another object in the user interface based on the priority of the filtered set of anchor points.

2. The method as described in claim 1, wherein the generating includes generating at least one said candidate anchor point that is explicit based on a vector geometry used to define the object.

3. The method as described in claim 1, wherein the generating includes generating at least one said candidate anchor point that is implicit by analyzing a local maximum or minimum in a geometry used to define the object.

4. The method as described in claim 1, wherein the generating includes generating at least one said candidate anchor point this is implicit by analyzing curvature in a geometry used to define the object.

5. The method as described in claim 1, wherein the filtering is performed such that at least one anchor point of the filtered set of anchor points corresponds to a corner of the object.

6. The method as described in claim 1, wherein the filtering is based on a curvature of a geometry of the object.

7. The method as described in claim 6, further comprising:
identifying a plateau in a curvature plot generated based on the object; and
finding an extreme between samples points from the curvature plot between a start point and an end point of the plateau, and wherein the extreme is included in the filtered set of anchor points.

8. The method as described in claim 1, wherein the filtering includes determining visual importance of the candidate anchor points, respectively, by:
removing a respective said candidate anchor point from a geometry of the object;
ascertaining whether a visual change occurred to the object resulting from the removing; and
including the respective said candidate anchor point in the filtered set of anchor points responsive to the ascertaining that the visual change did occur.

9. The method as described in claim 1, wherein the determining the priority includes:
identifying a subset of the filtered set of anchor points that satisfy a constraint of the location operation;
assigning weights to the subset of the filtered set of anchor points, respectively; and
selecting an anchor point from the subset of the filtered set of anchor points for use in the location operation based on the weights.

10. The method as described in claim 9, wherein the weights are based at least in part on a direction of movement of the object in the user interface.

11. The method as described in claim 9, wherein the weights are based at least in part on a distance of respective said anchor points in the subset of the filtered set of anchor points to a selection point of the object in the user interface.

12. The method as described in claim 1, wherein the location operation is a snapping operation, alignment operation, or spacing operation.

13. The method as described in claim 1, wherein the controlling of the location operation includes outputting one or more guides in the user interface indicating alignment or spacing of the object in relation to the another object based on a respective said anchor point identified based on the priority of the filtered set of anchor points.

14. In a digital medium object location environment, a system comprising:
a candidate generation module implemented at least partially in hardware of a computing device to generate candidate anchor points for an object included in a digital image displayed in a user interface;
a filter module implemented at least partially in hardware of the computing device to filter the candidate anchor points to generate a filtered set of anchor points;
a prioritization module implemented at least partially in hardware of the computing device to determine a priority of the filtered set of anchor points, one to another; and
a location management module implemented at least partially in hardware of the computing device to control a location operation specifying a location of the object in relation to a location of another object in the user interface based on the priority of the filtered set of anchor points.

15. The system as described in claim 14, wherein the filter module is configured to filter based on a curvature of a geometry of the object or is performed such that at least one anchor point of the filtered set of anchor points corresponds to a corner of the object.

16. The system as described in claim 14, wherein the candidate generation module is configured to generate at least one said candidate anchor point that is:
explicit based on a vector geometry used to define the object;
implicit by analyzing a local maximum or minimum in a geometry used to define the object; or
implicit by analyzing curvature in a geometry used to define the object.

17. The system as described in claim 14, wherein the filter module is configured to filter based on visual importance of the candidate anchor points, respectively, by:
removing a respective said candidate anchor point from a geometry of the object; and
ascertaining whether a visual change occurred to the object resulting from the removing; and
including the respective said candidate anchor point in the filtered set of anchor points responsive to the ascertaining that the visual change did occur.

18. The system as described in claim 15, wherein the prioritization module is configured to determine the priority by:
identifying a subset of the filtered set of anchor points that satisfy a constraint of the location operation;
assigning weights to the subset of the filtered set of anchor points, respectively; and
selecting an anchor point from the subset of the filtered set of anchor points for use in the location operation based on the weights.

19. A non-transitory computer-readable storage medium having instructions stored thereon that, responsive to execution by a processor, causes the processor to perform operations including:
generating candidate anchor points for an object included in a digital image displayed in a user interface;
filtering the candidate anchor points to generate a filtered set of anchor points;
determining priority of the filtered set of anchor points, one to another; and controlling a location operation based on a location of the object in relation to a location of another object in the user interface based on the priority of the filtered set of anchor points.

20. The non-transitory computer-readable storage medium as described in claim 19, wherein the generating the candidate anchor points includes generating at least one said candidate anchor point that is explicit based on a vector geometry used to define the object.

* * * * *